United States Patent [19]
Vicard et al.

[11] Patent Number: 6,003,105
[45] Date of Patent: Dec. 14, 1999

[54] LONG-HAUL PCI-TO-PCI BRIDGE

[75] Inventors: Dominique Vicard, Bernin; Jean-Paul Moiroux; Pierre-Yves Thoulon, both of Grenoble, all of France

[73] Assignee: Hewlett-Packard Company, Palo Alto, Calif.

[21] Appl. No.: 08/963,536

[22] Filed: Nov. 3, 1997

[30] Foreign Application Priority Data

Nov. 21, 1996 [EP] European Pat. Off. .............. 96410116

[51] Int. Cl.[6] .................................................. G06F 13/40
[52] U.S. Cl. ........................... 710/129; 710/128; 710/126
[58] Field of Search .................................. 395/308, 309, 395/306, 281, 287, 280, 733, 293, 821; 710/128, 129, 126, 101, 107, 100, 260, 113, 1

[56] References Cited

U.S. PATENT DOCUMENTS

| | | | |
|---|---|---|---|
| 5,430,847 | 7/1995 | Bradley et al. ........................... | 395/325 |
| 5,535,341 | 7/1996 | Shah et al. ............................... | 395/306 |
| 5,664,117 | 9/1997 | Shah et al. ............................... | 395/280 |
| 5,678,009 | 10/1997 | Bains et al. .............................. | 395/305 |
| 5,761,450 | 6/1998 | Shah et al. ............................... | 395/287 |
| 5,764,924 | 6/1998 | Hong ....................................... | 395/281 |

FOREIGN PATENT DOCUMENTS 0395416  10/1990  European Pat. Off. .

OTHER PUBLICATIONS

European Search Report, EP 9640116.

*Primary Examiner*—Ayaz R. Sheikh
*Assistant Examiner*—Tim T. Vo

[57] ABSTRACT

A long-haul PCI bridge pier is provided that comprises a PCI interface for connection to a PCI bus, a high speed link interface for connection to a high speed link, and a PCI adapter operative to transform PCI information received at said PCI interface into high speed information to be transmitted through the high speed interface, and operative to transform high speed information received at said high speed interface into PCI information to be transmitted through the PCI interface. The PCI bridge pier permits remote connection of a PCI bus with a high speed link such as a serial link. Two such PCI bridge piers, in combination with a high speed link may be used for implementing a long haul PCI-to-PCI bridge.

16 Claims, 3 Drawing Sheets

LONG-HAUL PCI-TO-PCI BRIDGE

FIELD OF THE INVENTION

The present invention relates to a bridge between two PCI buses (herein a "PCI-to-PCI bridge") and to the circuitry provided at each end of such a bridge (this circuitry being hereinafter referred to as a "PCI bridge pier").

PCI (Peripheral Component Interconnect) is a specification for 32-bit local buses in personal computers designed for fast access to peripherals such as display boards, disk drives, etc. For instance, PCI buses are extensively used for computers using Pentium (registered trademark) microprocessors manufactured by Intel. The PCI specification is however independent from the processor used.

BACKGROUND OF THE INVENTION

A PCI-to-PCI bridge chip has been proposed to extend the PCI bus in a personal computer. This chip provides a connection path between two independent PCI buses, and allows transactions to occur between a master on one PCI bus and a slave on the other PCI bus. This PCI-to-PCI bridge permits creation of hierarchical PCI buses in a computer, so as to overcome electrical and loading limits in the original PCI bus of a computer. Basically, a PCI-to-PCI bridge chip has a first interface for connection to a first PCI bus—e.g. a PCI bus connected to the host bridge of a host bus in a computer—and a second interface for connection to a second PCI bus. 25

FIG. 1 is a diagrammatic view of a configuration of a PCI-to-PCI bridge chip. The chip 1 comprises a primary interface 2 for connecting to a first PCI bus, a secondary interface 3 for connecting to a second PCI bus, a data path 4 between the primary and secondary interfaces, and a control path 5 between the primary and secondary interfaces. The control path 5 may for instance comprise a primary slave interface 6 and a primary master interface 8, both connected to the primary interface 2; a secondary master interface 7 and a secondary slave interface 9, both connected to the secondary interface 3. The primary slave interface 6 is also connected to the secondary master interface 7, and the primary master interface 8 is connected to the secondary slave interface 9. The primary slave interface 6 receives a transaction transmitted by a master on a PCI bus connected to the primary interface and passes it to the secondary master interface 7. It also controls the configuration of the data path 4. The secondary master interface 7 transmits the transaction to a slave located on a PCI bus connected to the secondary interface. A transaction from a master on a PCI bus connected to the secondary interface to a slave located on a PCI bus connected to the primary interface is handled similarly by the secondary slave interface 9 and the primary master interface 8.

This PCI-to-PCI bridge is satisfactory as a solution to the above mentioned problem of electrical loading. It is also satisfactory for providing exclusive PCI-to-PCI connection in a computer, that is for transmitting and receiving PCI transactions.

SUMMARY OF THE INVENTION

The present invention is based on the appreciation that a number of benefits could be achieved by providing a long haul PCI bridge pier, not in itself a stand-alone item providing for PCI-to-PCI connection and therefore not previously attracting attention as a useful way forward. However, such a PCI bridge pier permits the construction of long haul PCI-to-PCI bridges that permit connecting non-adjacent PCI buses, such as PCI buses located in two different mechanical enclosures. Thus the present invention leads to a solution to the new problem of providing a complete connection between several mechanical enclosures of a personal computer (or more generally a computing system) where each enclosure contains PCI elements. A complete connection of the type provided by the invention allows transmitting and receiving not only PCI transactions, but also other types of information.

More precisely, the present invention provides a long-haul PCI bridge pier, comprising a PCI interface for connection to a PCI bus, a high speed link interface for connection to a high speed link, and a PCI adapter operative to transform PCI information received at said PCI interface into high speed information to be transmitted through the high speed interface, and operative to transform high speed information received at said high speed interface into PCI information to be transmitted through the PCI interface.

According to an embodiment of the invention, the long-haul PCI bridge pier further comprises a non-PCI interface, and a non-PCI adapter operative to transform information received at said non-PCI interface into high speed information to be transmitted through the high speed interface, and operative to transform high speed information received at said high speed interface into information to be transmitted through the non-PCI interface.

The high speed link interface may be adapted for connection to a serial link.

The PCI interface preferably comprises a master interface and a slave interface, and the PCI adapter preferably comprises a master buffer connected to the master interface and a slave buffer connected to the slave interface.

In this case, it is advantageous that the master buffer comprises an inbound write data queue for receiving write data for a PCI write transaction received on the high speed interface, an inbound transaction queue for receiving transaction data for a PCI write transaction received on the high speed interface, and an outbound read data queue for receiving read data from the master interface in answer to a PCI read transaction received on the high speed interface.

It is also advantageous that the slave buffer comprises an outbound write data queue for receiving write data for a PCI write transaction received at the slave interface, an outbound transaction queue for receiving transaction data for a PCI write transaction received at the slave interface, and an inbound read data queue for receiving read data from the high speed interface in answer to a PCI read transaction received at the slave interface.

The present invention also relates to a PCI-to-PCI bridge comprising a first and a second long-haul PCI bridge pier of this type, and a high speed link, one end of which is connected to a PCI interface of the first long-haul PCI bridge pier, and another end of which is connected to a PCI interface of the second long-haul PCI bridge pier. Long haul bridges for extending bus systems are not in themselves new, one example of such a bus extender being described in U.S. Pat. No. 4,451,886 (Hewlett-Packard Company).

The present invention further relates to a long haul connection for a remote PCI bus in a computer, comprising such a long-haul PCI bridge pier, and a high speed link, one end of which is connected to a PCI interface of the long-haul PCI bridge pier, and another end of which is connected to a I/O controller of the computer.

The present invention additionally relates to a multiple processor system, comprising at least two machines each comprising a PCI bus, and at least one such PCI-to-PCI bridge for connecting the PCI buses of the at least two machines.

BRIEF DESCRIPTION OF THE DRAWINGS

Embodiments of the invention will now be described, by way of non-limiting example, with reference to the accompanying diagrammatic drawings in which.

BEST MODE OF CARRYING OUT THE INVENTION

Figure 2:
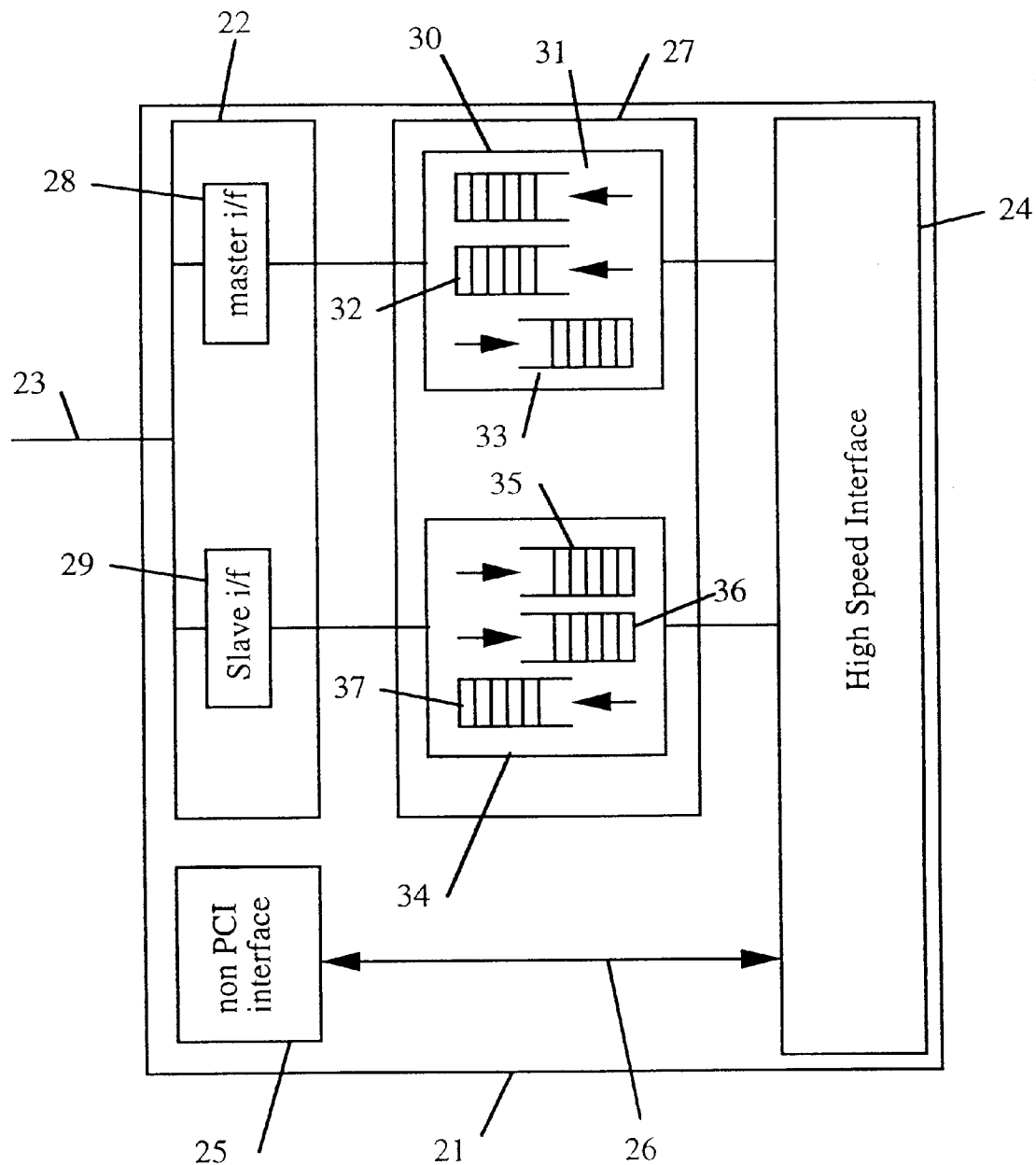
FIG. 2 is a diagrammatic view of a configuration of a long-haul PCI bridge pier embodying the invention.

FIG. 2 is a diagrammatic view of a configuration of a long-haul PCI bridge pier embodying the invention; the PCI bridge pier 21 of FIG. 2 comprises a PCI interface 22 for connecting to a PCI bus 23, and a high speed interface 24 for connecting to a high speed long haul link. The term "high speed" is intended to cover any link having a speed sufficient to accommodate the speed of information transfer on the PCI bus that is to be connected to the PCI bridge pier. The term "long haul" is intended to cover any link permitting a remote connection, that is a connection between non adjacent devices; several examples of "long haul" connections are given in the rest of the present description.

As an example, where the PCI bridge pier is intended to interface with a standard 33 MHz/32-bit PCI bus, the high speed long haul link may comprise a high-speed serial fibre-optic link, that will permit connections at speeds around 1 Gigabits/sec, for distances of a few meters.

The PCI bridge pier may also comprise a non-PCI interface 25 for receiving and transmitting non PCI information. Examples of such non-PCI information are also given in the rest of the present description. The non-PCI interface 25 is connected through a non-PCI adapter 26 to the high speed interface 24; information received on the non-PCI interface 25 is handled in the non-PCI adapter, transformed, and passed to the high speed interface 24 under the proper format for transmission on a high speed link connected to the high speed interface. In the other direction, information received on the high speed interface 24 is handled in the non-PCI adapter, transformed, and passed to the non-PCI interface 25 under the proper format for transmission to the device connected to the non-PCI interface 25. In a minimal configuration, the non-PCI adapter will comprise input and output queues or buffers for storing and delivering information received on the non-PCI interface 25 and on the high speed interface 24. The exact configuration of the non-PCI adapter 26 will depend on the Nature and structure of the non-PCI information to be transmitted.

The PCI interface 22 is connected through a PCI adapter 27 to the high speed interface 24; PCI information or transactions received from a PCI bus connected to the PCI interface 22 is handled in the PCI adapter 27, transformed, and passed to the high speed interface 24 under the proper format for transmission on a high speed link connected to the high speed interface. In the other direction, information received on the high speed interface 24 is handled in the PCI adapter 27, transformed, and passed to the PCI interface 22, from which it may be transmitted on a PCI bus connected to the PCI interface 22.

The PCI interface 22 may comprise a master interface 28, and a slave interface 29. In this case, the PCI adapter 27 will comprise a master buffer 30 and a slave buffer 34. The master interface 28 is connected to the master buffer 30, which comprises an inbound write data queue 31, an inbound transaction queue 32, and an outbound read data queue 33. The master buffer 30 is connected to the high speed interface 24. Similarly, the slave interface 29 is connected to a slave buffer 34, which comprises an outbound write data queue 35, an outbound transaction queue 36, and an inbound read data queue 37. The slave buffer 34 is connected to the high speed interface 24.

The operation of the above described PCI adapter is as follows. A PCI transaction transmitted by a master on a PCI bus connected to the PCI interface 22 and intended to pass through the PCI bridge pier 21 is received by the slave interface 29. The slave interface 29 handles the transaction. If the transaction is a "write" transaction, the slave interface 29 outputs to the slave buffer 34 the corresponding information for storing in the outbound write data queue 35 and in the outbound transaction queue 36. The contents of these two queues may then be transmitted through the high speed interface 24 on the high speed link connected to the high speed interface 24. If the transaction is a "read" transaction, the slave interface 29 outputs to the slave buffer 34 the corresponding information for storing in the outbound transaction queue 36, and expects to receive the read data from the inbound read data queue 37.

Similarly, a PCI transaction intended for a slave on a PCI bus connected to the PCI interface 22 is received on the high speed interface 24. If the transaction is a "write" transaction, it is buffered in the inbound write data queue 31 and in the inbound transaction queue 36 of the master buffer 30. The "write" transaction is then transmitted on a PCI bus connected to the PCI interface 22 by the master interface 28. If the transaction is a "read" transaction, the master interface 28 receives from the master buffer 34 the corresponding information stored in the inbound transaction queue 32, and is expected to transmit to the master buffer 30 the read data, for storing into the outbound read data queue 33.

The long-haul PCI bridge pier embodying the invention therefore permits transmitting and receiving PCI transactions and non-PCI transactions, to and from a high speed link connected to the high speed interface 24. Several examples of use of the PCI bridge pier embodying the invention are now described.

Figure 1:
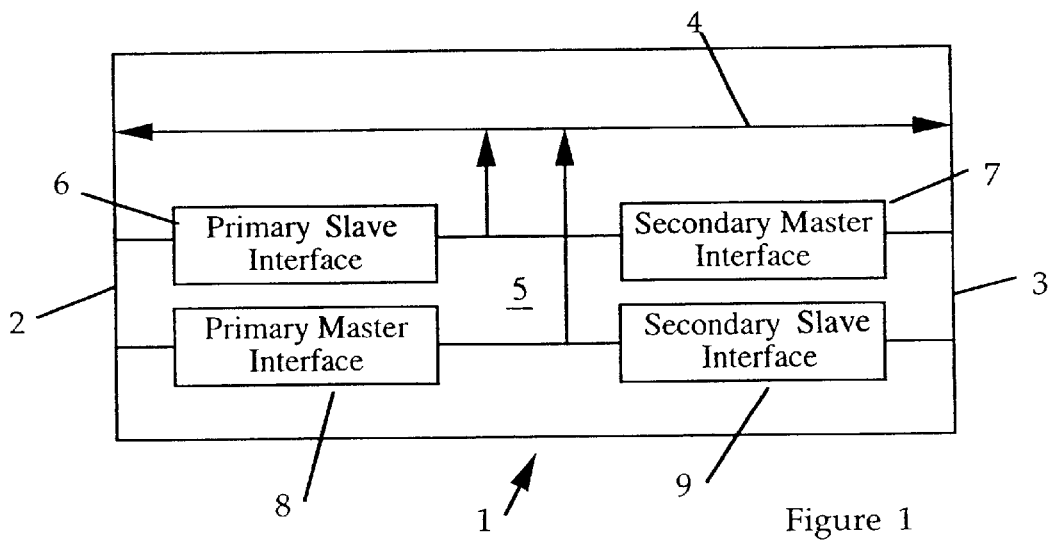
FIG. 1 is a diagrammatic view of a configuration of a known PCI-to-PCI bridge chip.
Figure 3:
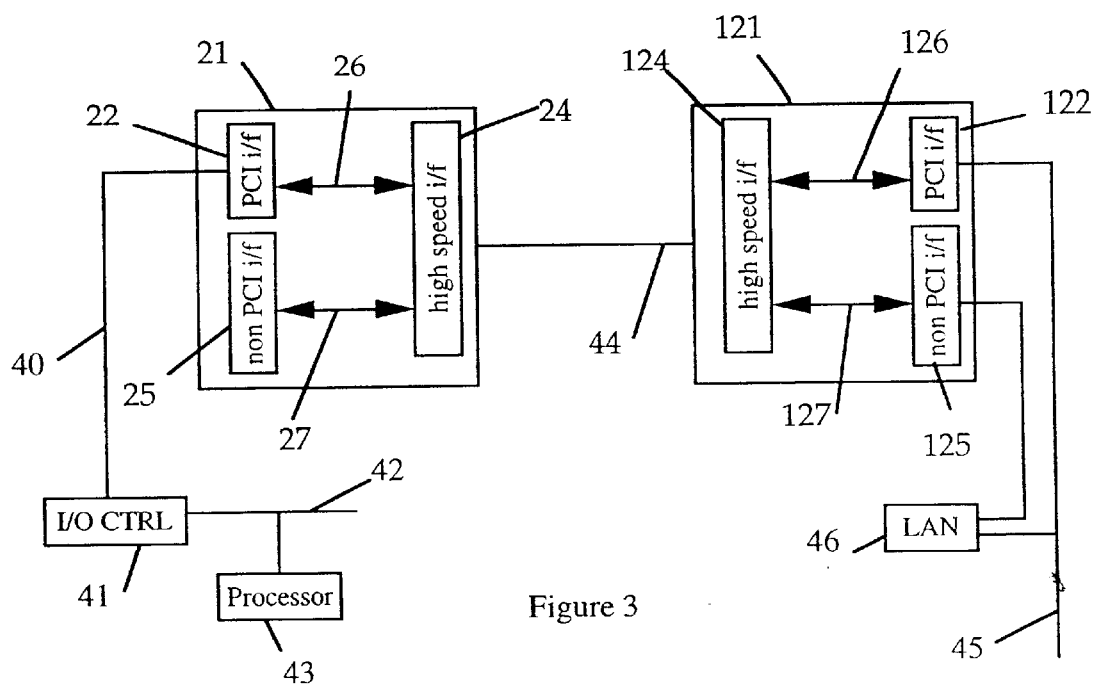
FIG. 3 is a diagrammatic view of a first possible use of a long-haul PCI bridge pier embodying the invention.

FIG. 3 is a diagrammatic view of a first possible use of a long-haul PCI bridge pier embodying the invention, to provide a PCI-to-PCI bridge. The PCI-to-PCI bridge of FIG. 3 may for instance be used for providing a second PCI bus remote from a first PCI bus. This may be useful, as explained below, if the components of a computing system are arranged in two different mechanical enclosures.

The device of FIG. 3 comprises two long-haul PCI bridge piers embodying the invention 21, 121. The first one is referenced with the reference numbers used on FIG. 2; the second one is referenced with the reference numbers of FIG. 2 increased by 100.

The long-haul PCI bridge pier 21 is connected through its PCI interface to a first PCI bus 40. This PCI bus 40 is itself connected to the I/O controller 41 of a computer. The I/O controller 41 is connected to the processor bus 42 of the computer. A microprocessor 43 is connected to the bus 42. One end of a high speed link 44, such as a high speed serial link is connected to the high speed interface 24 of the long-haul PCI bridge pier 21. At its other end, the high speed link 44 is connected to the high speed interface 124 of the long-haul PCI bridge pier 121. A second PCI bus 45 is connected to the PCI interface 122 of the long-haul PCI bridge pier 121. An I/O card, e.g. a LAN card 46 is connected to the second PCI bus 45.

The use of the long haul PCI bridge piers 21 and 121 as depicted in FIG. 3 provides for connection to a remote PCI bus 45. The PCI transactions are handled transparently by the PCI-to-PCI bridge 21, 44, 121 of FIG. 3, so that there is no need to adapt any software or hardware.

The device of FIG. 3 may use the non-PCI information adapter 26, 126 provided in the long haul PCI bridge piers 21, 121. For the exemplified LAN card, a special signal may be sent through the LAN and received on the LAN card 46, for waking up the computer. This signal does not correspond to a PCI transaction, but is intended to be sent to a specific terminal on the motherboard of the computer. The non-PCI interfaces 25, 125, the non PCI adapters 26, 126, the high speed interfaces 24, 124 of the long haul PCI bridge piers, in combination with the link 44, constitue a non-PCI channel 25, 26, 24, 44, 124, 126, 125 that may be used for transmitting the wake-up signal from the LAN card connected to the second PCI bus 45 to the motherboard of the computer. For this purpose, the LAN card 26 is connected to the non-PCI interface of the long haul PCI bridge pier 121. On the other side, the specific terminal is connected to the non-PCI interface of the the long haul PCI bridge pier 21. This is only an example of the use of the non-PCI channel. The use of the described long-haul bridge of the invention allows to have only one link 44, to transmit all types of signals, and avoids unnecessary replication of links.

FIG. 4 is a diagrammatic view of second possible use of a long-haul PCI bridge pier embodying the invention; the device of FIG. 4 again comprises two long-haul PCI bridge piers embodying the invention 21, 121, referenced as in FIG. 3. The long-haul PCI bridge pier 21 is connected through its PCI interface to a first PCI bus 40. This PCI bus 40 is itself connected to the I/O controller 41 of a first computer. The I/O controller 41 is connected to the processor bus 42 of the first computer. A microprocessor 43 is connected to the bus 42. One end of a high speed link 44, such as a high speed serial link, is connected to the high speed interface of the long-haul PCI bridge pier 21. At its other end, the high speed link 44 is connected to the high speed interface 124 of the long-haul PCI bridge pier 121. The long-haul PCI bridge pier 121 is connected through its PCI interface to a second PCI bus 140. This PCI bus 140 is itself connected to the I/O controller 141 of a second computer. The I/O controller 141 is connected to the processor bus 142 of the second computer. A microprocessor 143 is connected to the bus 142.

Figure 4:
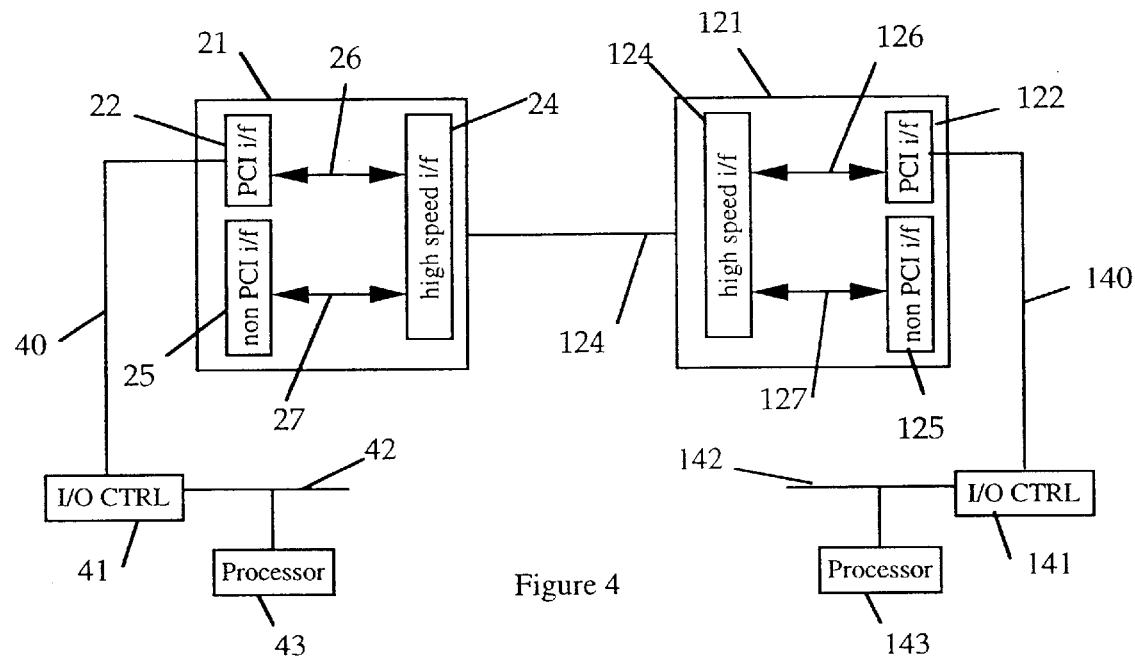
FIG. 4 is a diagrammatic view of second possible use of a long-haul PCI bridge pier embodying the invention.

The device depicted on FIG. 4 uses two long-haul PCI bridge piers embodying the invention for building a dual processor machine, based on two computers. In this case, the PCI channel 22, 27, 24, 44, 124, 127, 122 of the PCI-to-PCI bridge may be used for transmitting usual PCI transactions transmitted from a master on the PCI bus 40, 140 of one of the computers to a slave on the PCI bus 140, 40 of the other one of the computers.

The two processor machine of FIG. 4 will use specific messages to manage system and memory configuration among the two processors, for ensuring consistency of cache memory contents, and so on. These specific messages may be transmitted as specific PCI transactions—if such transactions are available—on the PCI channel 22, 27, 24, 44, 124, 127, 122 of the PCI-to-PCI bridge, that is formed by the PCI interfaces 22, 122, the PCI adapters 27, 127, the high speed interfaces 24, 124, and the link 44. However, as an alternative, the specific messages for managing the dual processor machine may also be transmitted on the non-PCI channel 25, 26, 24, 44, 124, 126, 125 of the PCI-to-PCI bridge.

The use of the long haul PCI bridge piers as depicted in FIG. 4 permits simple and efficient connection of two computers to form a dual processor machine. This arrangement minimises specific hardware developments for building the dual processor machine. Again, FIG. 4 is merely another example of possible use of two long-haul PCI bridge piers embodying the invention.

Figure 5:
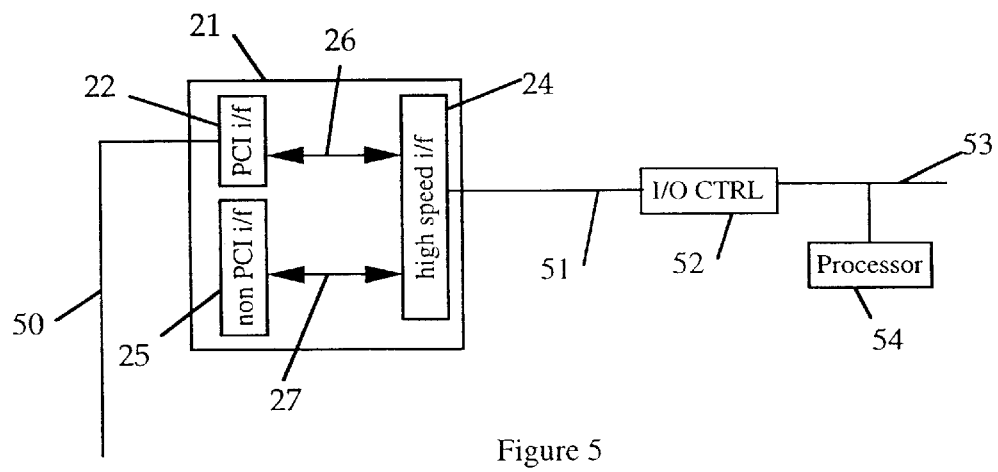
FIG. 5 is a diagrammatic view of a third possible use of a long-haul PCI bridge pier embodying the invention.

FIG. 5 is a diagrammatic view of a third possible use of a long-haul PCI bridge pier embodying the invention; in the device of FIG. 5, the long-haul PCI bridge pier is used to provide a remote PCI bus.

A remote PCI bus 50 is connected to the PCI interface 22 of a long haul PCI bridge pier 21. The high speed interface 24 of the PCI bridge pier 21 is connected to one end of a high speed link 51. The other end of the high speed link 51 is connected directly to an I/O controller 52. The I/O controller 52 is connected to the processor bus 53; a processor 54 is connected to the bus 53.

The operation of the FIG. 5 arrangement is similar to the operation of the FIG. 3 arrangement. However, contrary to the FIG. 3 arrangement, the FIG. 5 arrangement does not necessarily comprise a PCI bus connected to the I/O controller 52. This may be useful if no I/O devices are necessary adjacent to processor 54. It is of course still possible to provide a PCI bus connected to this I/O controller, or to provide only a PCI bus with reduced capabilities or features.

The described embodiments of the invention make it possible to separate the different components of a computing system in several mechanical enclosures, without the need of specific software and hardware solution. For instance, it is possible to have the core logic components of the computer in a first mechanical enclosure, and to have the user interface components in one or more other mechanical enclosures. The core logic elements—processor, memory, I/O bridge—may be fitted in the first mechanical enclosure, that need not be changed according to the type and/or model of the computer. On the other hand, the user interface components, such as floppy drives, CD-ROM drives, and the like, may be accommodated in distinct mechanical enclosures, and adapted to the needs of the user and/or the type or model of the computer. This also allows a more efficient and stable management of power supply. The power supply in the core logic enclosure can be precisely tailored to the power consumption and requirements of the core logic components, without the need to provide a power supply for an unknown number of user interface devices.

The described embodiments of the invention permit these features to be achieved without the need for any specific hardware or software adaption of the computer.

Embodiments of the invention can be readily implemented by the person skilled in the art of computers design on the basis of the present description. Other uses of the invention may be contemplated, as will also be apparent to the skilled person: the types of PCI or non-PCI data given above are only exemplary, and may be adapted easily to specific needs. For instance, a multiple processor system may easily be implemented using the principle described in reference to FIG. 4, by connecting several machines each comprising a PCI bus through PCI-to-PCI bridges.

It will be appreciated that the present invention is applicable not only to PCI buses but also to other buses used for peripheral interconnect.

We claim:

1. A long-haul PCI bridge pier comprising a PCI interface for connection to a PCI bus, a high speed link interface for connection to a high speed link, and a PCI adapter operative to transform PCI information received at said PCI interface into high speed information to be transmitted through the high speed link interface, and operative to transform high speed information received at said high speed link interface into PCI information to be transmitted through the PCI interface, said PCI bridge pier further comprising a non-PCI interface, and a non-PCI adapter operative to transform information received at said non-PCI interface into high speed information to be transmitted through the high speed link interface, and operative to transform high speed information received at said high speed link interface into information to be transmitted through the non-PCI interface.

2. A long-haul PCI bridge pier according to claim 1, wherein the high speed link interface is adapted for connection to a serial link.

3. A long-haul PCI bridge pier according to claim 1, wherein the PCI interface comprises a master interface and a slave interface, and wherein the PCI adapter comprises a master buffer connected to the master interface and a slave buffer connected to the slave interface.

4. A PCI-to-PCI bridge comprising a first and a second long-haul PCI bridge pier according to claim 1, and a high speed link, one end of which is connected to a PCI interface of the first long-haul PCI bridge pier, and another end of which is connected to a PCI interface of the second long-haul PCI bridge pier.

5. A long haul connection for a remote PCI bus in a computer, comprising a long-haul PCI bridge pier according to claim 1, and a high speed link, one end of which is connected to a PCI interface of the long-haul PCI bridge pier, and another end of which is connected to a I/O controller of the computer.

6. A long-haul PCI bridge pier according to claim 3, wherein the master buffer comprises an inbound write data queue for receiving write data for a PCI write transaction received on the high speed link interface, an inbound transaction queue for receiving transaction data for a PCI write transaction received on the high speed link interface, and an outbound read data queue for receiving read data from the master interface in answer to a PCI read transaction received on the high speed link interface.

7. A long-haul PCI bridge pier according to claim 3, wherein the slave buffer comprises an outbound write data queue for receiving write data for a PCI write transaction received at the slave interface, an outbound transaction queue for receiving transaction data for a PCI write transaction received at the slave interface, and an inbound read data queue for receiving read data from the high speed link interface in answer to a PCI read transaction received at the slave interface.

8. A multiple processor system, comprising at least two machines each comprising a PCI bus, and at least one PCI-to-PCI bridge according to claim 4 for connecting the PCI buses of the at least two machines.

9. A PCI-to-PCI bridge according to claim 4, wherein the high speed link is a physical point-to-point connection.

10. A personal computer comprising two mechanical enclosures, each comprising a PCI bus and at least one PCI-TO-PCI bridge according to claim 8, for connecting the PCI buses of the two enclosures.

11. A personal computer comprising two mechanical enclosures, each comprising a PCI bus and at least one PCI-TO-PCI bridge according to claim 8, for connecting the PCI buses of the two enclosures.

12. PCI bridge apparatus comprising;

a PCI interface for connection to a PCI bus, the PCI interface comprising a master interface and a slave interface;

a high speed link interface adapted for connection to a high speed serial link;

a PCI adapter operative to transform PCI information received at said PCI interface into high speed information to be transmitted through the high speed link interface, and operative to transform high speed information received at said high speed link interface into PCI information to be transmitted through the PCI interface, the PCI adapter comprising a master buffer connected to the master interface, the master buffer having an inbound write data queue for receiving write data for a PCI write transaction received on the high speed link interface, an inbound transaction queue for receiving transaction data for a PCI write transaction received on the high speed interface, and an outbound read data queue for receiving read data from the master interface in answer to a PCI read transaction received on the high speed link interface, the PCI adapter further comprising a slave buffer connected to the slave interface, the slave buffer having an outbound write data queue for receiving write data for a PCI write transaction received at the slave interface, an outbound transaction queue for receiving transaction data for a PCI write transaction received at the slave interface, and an inbound read data queue for receiving read data from the high speed interface in answer to a PCI read transaction received at the slave interface, said PCI adapter further comprising a non-PCI interface, and a non-PCI adapter operative to transform information received at said non-PCI interface into high speed information to be transmitted through the high speed link interface, and operative to transform high speed information received at said high speed link interface into information to be transmitted through the non-PCI interface.

13. A PCI-to-PCI bridge comprising first and second PCI bridge apparatus, each according to claim 12, and a high speed serial link, one end of which is connected to a PCI interface of the first PCI bridge apparatus, and another end of which is connected to a PCI interface of the second PCI bridge apparatus.

14. A long haul connection for a remote PCI bus in a computer, comprising PCI bridge apparatus according to claim 12, and a high speed serial link, one end of which is connected to a PCI interface of the PCI bridge apparatus, and another end of which is connected to a I/O controller of the computer.

15. A multiple processor system, comprising at least two machines each comprising a PCI bus, and at least one PCI-to-PCI bridge according to claim 13 for connecting the PCI buses of the at least two machines.

16. A PCI-to-PCI bridge according to claim 13, wherein the high speed link is a physical point-to-point connection.

* * * * *